(12) United States Patent
Black et al.

(10) Patent No.: US 9,934,263 B1
(45) Date of Patent: Apr. 3, 2018

(54) BIG-FAST DATA CONNECTOR BETWEEN IN-MEMORY DATABASE SYSTEM AND DATA WAREHOUSE SYSTEM

(71) Applicant: Pivotal Software, Inc., Palo Alto, CA (US)

(72) Inventors: Charles M. Black, San Diego, CA (US); Christopher T. Keene, San Francisco, CA (US); Richard Lamb, Beaverton, OR (US); Barrett T. Oglesby, Aloha, OR (US)

(73) Assignee: Pivotal Software, Inc., San Francisco, CA (US)

( * ) Notice: Subject to any disclaimer, the term of this patent is extended or adjusted under 35 U.S.C. 154(b) by 221 days.

(21) Appl. No.: 14/886,640

(22) Filed: Oct. 19, 2015

Related U.S. Application Data

(63) Continuation of application No. 13/756,272, filed on Jan. 31, 2013, now Pat. No. 9,183,271.

(60) Provisional application No. 61/733,269, filed on Dec. 4, 2012.

(51) Int. Cl.
*G06F 7/00* (2006.01)
*G06F 17/30* (2006.01)

(52) U.S. Cl.
CPC .... *G06F 17/30318* (2013.01); *G06F 17/3033* (2013.01)

(58) Field of Classification Search
None
See application file for complete search history.

(56) References Cited

U.S. PATENT DOCUMENTS

| | | | |
|---|---|---|---|
| 6,332,158 B1 * | 12/2001 | Risley | G06F 17/30887 707/E17.115 |
| 8,873,572 B2 * | 10/2014 | Bahr | H04W 60/00 370/389 |
| 2002/0008703 A1 * | 1/2002 | Merrill | G06F 8/00 345/473 |
| 2004/0205048 A1 * | 10/2004 | Pizzo | G06F 17/30368 |
| 2005/0222931 A1 * | 10/2005 | Mamou | G06F 17/30563 705/35 |
| 2006/0271557 A1 * | 11/2006 | Harward | G06F 9/52 |
| 2007/0061444 A1 * | 3/2007 | Venkatesan | G06F 17/30575 709/224 |
| 2008/0208820 A1 * | 8/2008 | Usey | G06F 17/30616 |
| 2009/0018996 A1 | 1/2009 | Hunt et al. | |
| 2010/0069035 A1 * | 3/2010 | Johnson | H04W 4/02 455/404.1 |
| 2010/0121817 A1 | 5/2010 | Meyer et al. | |
| 2010/0174692 A1 * | 7/2010 | Meyer | G06F 17/30893 707/696 |
| 2011/0093500 A1 * | 4/2011 | Meyer | G06F 17/30893 707/774 |
| 2012/0246202 A1 | 9/2012 | Surtani et al. | |

(Continued)

*Primary Examiner* — Daniel Kuddus
(74) *Attorney, Agent, or Firm* — Fish & Richardson P.C.

(57) ABSTRACT

Embodiments of the present invention include systems and methods for insuring better query consistency between at least two different databases, where one faster database has more up-to-date information than another slower database, and wherein updates are typically applied to the faster database first and then to the slower database. In embodiments, the systems and methods also insure that a query to the slower database is not performed until a set of one or more updates from the faster database have been applied to that slower database.

9 Claims, 12 Drawing Sheets

(56) References Cited

U.S. PATENT DOCUMENTS

2013/0304842 A1* 11/2013 Zachariassen ...... H04L 67/1097
709/213
2014/0149485 A1* 5/2014 Sharma ................ H04L 67/142
709/202

* cited by examiner

Prior Approach

BIG-FAST DATA CONNECTOR BETWEEN IN-MEMORY DATABASE SYSTEM AND DATA WAREHOUSE SYSTEM

BACKGROUND

Field of Invention

The present patent document is directed towards systems and methods for data processing. More particularly, the present patent document is directed towards systems and methods that facilitate the handling of information between an in-memory database system and a data warehouse/analytics system.

Description of the Related Art

As more people and businesses use computers and as more services are provided electronically, today's modern applications are being required to receive, processes, and store vastly larger amounts of data. Furthermore, today's modern applications are also being required to respond faster and capture more information to allow businesses to perform the analyses needed for the making the best business decisions. Problems arise, however, because different processes have inherent weaknesses. When these systems interact, these weaknesses can compound, resulting in a system that, in some ways, is less than the sum of its parts.

Consider, for example, the current implementation of online transactional processing (OLTP) products and online analytical processing (OLAP) products. FIG. 1 depicts an in-memory database 105, which is an OLTP product, communicably coupled to a data warehouse 110, which is an OLAP product. OLTP products are systems that usually deal with a large number of real-time transaction-related applications. For example, as shown in FIG. 1, the in-memory database system 105 receives a plurality of real-time transactions 150. OLTP products' relative simplicity and efficiency allow them to be very responsive to these interactions—thereby allowing them to support near real-time data analysis and decision making. Hence, such products are referred to as "Fast Data." However, these "Fast Data" systems tend to operate on limited amounts of data that may be stored in its in-memory database. Huge volumes of data present significant challenges to OLTP products. Limited by the in-memory database(s), they cannot handle enough data needed for deep analytics.

Online analytical processing (OLAP) products, such as data warehouse products, are able to store and analyze much larger quantities of data. The vast data storage allows for more complex, deep, and spanning analytics to be performed; and hence, such products are sometimes referred to as "Big Data." However, like all things that are big, they tend to be slower. OLAP systems are slower for at least two reasons. First, because OLAP products receive and process significant amounts of data, they tend to receive the data in large batches, such as overnight batch jobs. For example, the in-memory database 105 might receive many data transactions 150 during the course of a certain time period, like a single day. The in-memory database 150 stores these transactions in its database for that day, and then during the evening, it 105 transmits the data in a batch 155 to the data warehouse 110. Because the data warehouse only receives updates at certain intervals, there is inherently a delay in its ability to act upon that data. Put simply, delays in receiving the data means delays in processing the data. And second, the structure and components of OLAP products tend to operate slower than in-memory systems.

While the currently-used implementation depict in FIG. 1 is useful, its "Big Data/Fast Data" duality has significant drawbacks. This two system approach results in data being stored in different systems, spanning different times, and with different abilities to analyze the data. Thus, a significant problem exists if someone wants to, in real-time (or near real-time) analyze newly received data with historical data. The current implementations cannot meet these demands due to limited query performance, limited amounts of data, and inaccessibility of the data.

Accordingly, what is need are systems and methods that can overcome the limitations of the bifurcated Big Data/Fast Data system to produce better, more comprehensive, and faster data analyses.

BRIEF DESCRIPTION OF THE DRAWINGS

Reference will be made to embodiments of the invention, examples of which may be illustrated in the accompanying figures, in which like parts may be referred to by like or similar numerals. These figures are intended to be illustrative, not limiting. Although the invention is generally described in the context of these embodiments, it should be understood that it is not intended to limit the scope of the invention to these particular embodiments.

DESCRIPTION OF THE PREFERRED EMBODIMENTS

Figure 1:
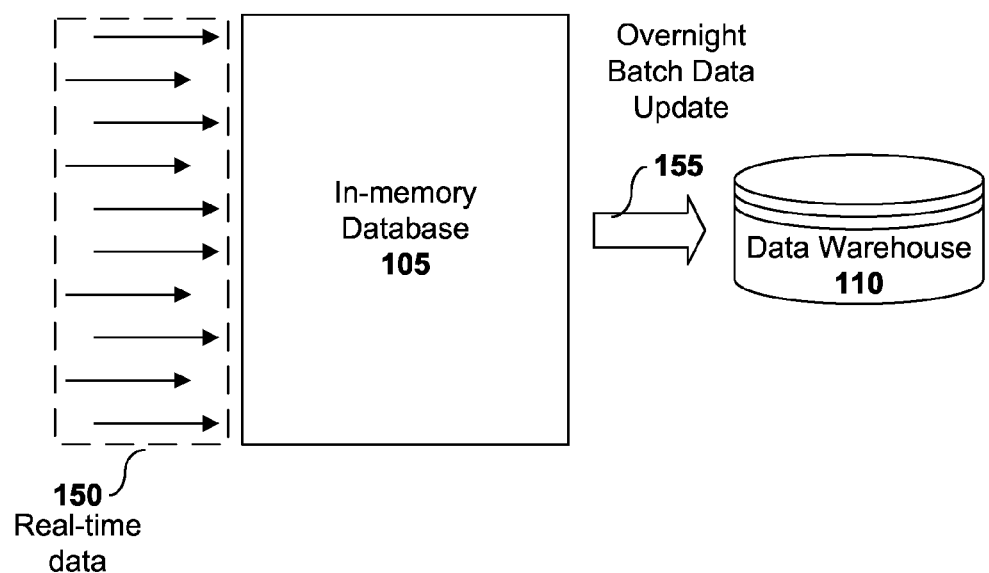
FIG. 1 depicts a current implementation of an online transactional processing (OLTP) product and an online analytical processing (OLAP) product.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described herein, may be implemented in a variety of ways, including software, hardware, firmware, or combinations thereof.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or modules.

Furthermore, connections between components within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

The use of certain terms in various places in the specification is for illustration and should not be construed as limiting. Usage of the term "service," "function," or "resource" is not limited to describing a single function; usage of the term also may refer to a grouping of related functions or functionality. Similarly, usage of these terms is not limited to describing a single resource; the term also may be used to refer to a set of resources that may either be distributed or aggregated within a computing environment.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, such phrases in various places in the specification are not necessarily all referring to the same embodiment or embodiments.

It shall be noted that the use of the terms "set" and "group" in this patent document shall include any number of elements. Furthermore, it shall be noted that methods or algorithms steps may not be limited to the specific order set forth herein; rather, one skilled in the art shall recognize that certain steps may be performed in different orders, including being done contemporaneously.

1. Introduction

As noted above, OLAP databases traditionally excel at handling petabytes of information but are not geared for fine-grained, low latency access. Similarly, OLTP systems excel at fine-grained, low latency access but typically fall short of handling large-scale data sets with ad-hoc queries. While a "Fast Data" in-memory database may be good at recognizing and responding to short-term opportunities in real time before they are gone, they are not well suited to analyze longer-term trends. While a "Big Data" system is good at finding opportunities one might have missed because it can perform more extensive analyses, it suffers from significant time delays and cannot therefore act in real-time. As noted above, the prior approaches were unable to effectively manage, store, and analyze large amounts of data in real-time (or near real-time). Accordingly, aspects of the current invention involve a connector or interface between the systems that accelerates the data loading process and data processing between in-memory database systems and data warehouse systems.

By combining the best online transactional processing (OLTP) and the best online analytical processing (OLAP), a platform according to embodiments of the present invention can enable businesses to make the best of both historical and real-time data. By utilizing the strengths of OLTP and OLAP systems, a platform according to embodiments of the present invention can cover the weaknesses of the prior approaches.

2. Fast Ingest

Figure 2:
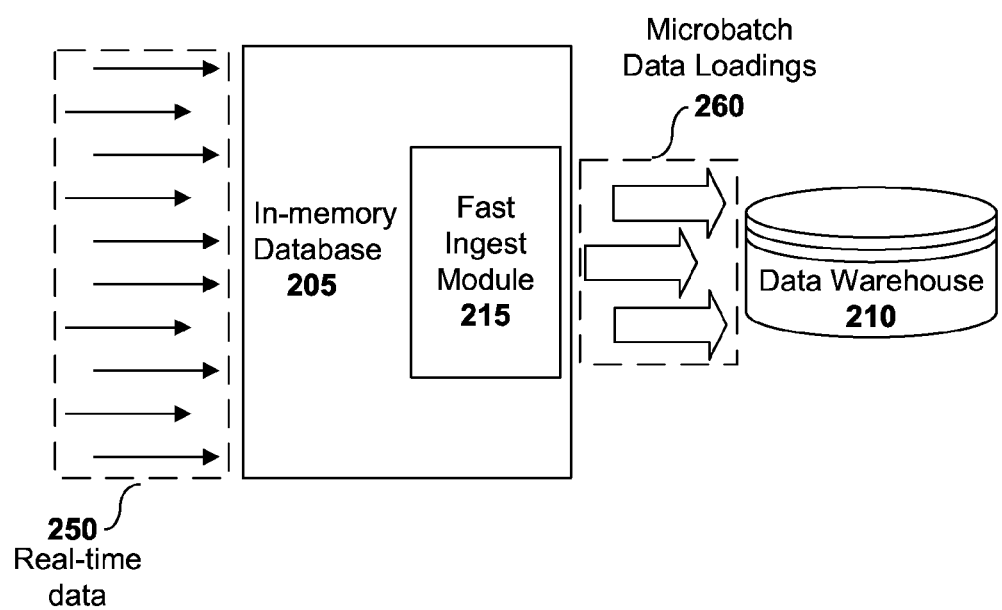
FIG. 2 graphically an embodiment in which a fast ingest module facilitates updates to a data warehouse according to embodiments of the present invention.

Turning now to FIG. 2, depicted is an embodiment of a fast ingest module that facilitates micro-batch updates according to embodiments of the present invention. FIG. 2 depicts an in-memory database 205, which may be a distributed system, communicatively coupled to a data warehouse 210. In embodiments, an in-memory database that may be used is the vFabric SQLFire by VMware, Inc. of Palo Alto, Calif. SQLFire is a memory-optimized shared-nothing distributed SQL database delivering dynamic scalability and high performance for data-intensive modern applications. SQLFire's memory-optimized architecture minimizes time spent waiting for disk access, a performance bottleneck in traditional databases. SQLFire can achieve scaling by pooling memory, CPU, and network bandwidth across a cluster of machines and can manage data across geographies. It shall be noted that other products (such as, by way of illustration and not limitation, GemFire by VMware of Palo Alto, Calif.) might also be used. In embodiments, a data warehouse product that may be used is Greenplum Database by Greenplum (a division of EMC), which is headquartered in San Mateo, Calif. Greenplum is built to support Big Data analytics by being able to manage, store, and analyze terabytes to petabytes of data. It shall be noted that other products might also be used.

To overcome the OLAP weakness of handling the fine-grained low latency, an OLTP engine (e.g., in-memory database 205) like SQLFire may be placed on the front end. By placing SQLFire in front of the data warehouse (e.g., data warehouse 210), users can extract, transform, and buffer the load into data warehouse on a parameterized basis (e.g., based on time, on number of new database entries, etc.) or according to event triggers, which fits well with how OLAP typically operate and on schedule with business processes.

SQLFire also offers up a highly available framework for handling valuable data as it is being loaded into the data warehouse 210. Thus, if a compute node fails, SQLFire can recover and rebalance the data load without shutting down the system. Also, if the data warehouse is brought down for some reason, SQLFire can continue to operate, queueing the data, and resuming where it left off once the data warehouse is restarted.

Figure 3:
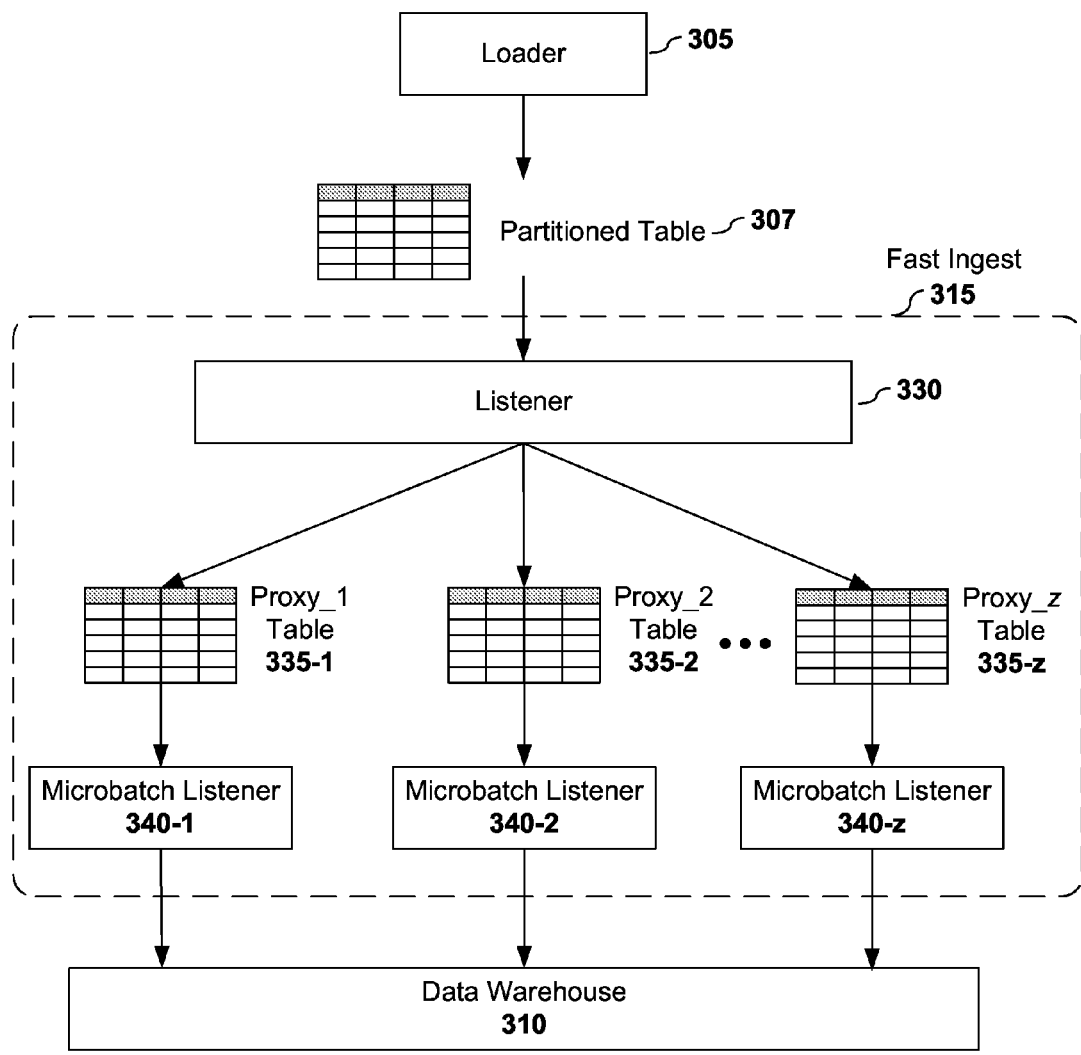
FIG. 3 illustrates a more detailed view of the components of the fast ingest module according to embodiments of the present invention.

As depicted in FIG. 2, the in-memory database system 205 comprises a fast ingest module 215. In embodiments, as real-time data 250 is received, the fast ingest module 215 is configured to listen for updates to data in the database 250 and to send updates to the data warehouse 210. FIG. 3 illustrates a more detailed view of the components of the fast ingest module and of the data flow according to embodiments of the present invention.

FIG. 3 shows a configuration that includes a fast ingest module 315 according to embodiments of the present invention. Depicted in FIG. 3 is a loader 305, a fast ingest module 315, and a data warehouse 310.

In embodiments, the loader is an external process that enables the in-memory data base to receive information from external sources. In embodiments, the fast ingest module 315 comprises a listener 330, which may be a synchronous listener, that receive notice that new data has been added to a table, such as table 307. It shall be noted that one environment in which the present invention may operate is within a data fabric or distributed system that comprises a plurality of database systems. Thus, in the depicted embodiment of FIG. 3, a partitioned table 307 may be used to distribute the data load across all of the servers in the data fabric.

As will be explained in more detail with respect to FIGS. 4 and 5, when alerted to a data event related to the table 307, which data event may be the creation, update, or deletion of data in the table, the listener 330 places the data event, which includes the data, into a queue, which may be one queue among a plurality of queues that form a queue system, to be sent to the data warehouse 310. In embodiments, the queues may be considered to be the proxy tables 335, the microbatch listeners 340, or a combination of the two components. In embodiments, the proxy tables are used to help ensure all of the members within the data fabric are sharing the load for inserting data into the data warehouse 310.

In embodiments, the proxy table 335 definition may be simpler than the partitioned table; this is done as an efficiency operation since this is the format for the external table definition required by the data warehouse. By so doing, this eliminates the extra steps needed to copy all of the columns from a portioned or partitioned table into the proxy tables. In embodiments, these portioned tables may be queried by a user.

In embodiment, one microbatch listener 340 is created for each proxy table in the system. In embodiments, the microbatch listeners are where the parameters that set the options for writing out to the data warehouse may be specified. For example, the parameters might be the batch size (which may be of any size), time intervals, certain events, or combinations thereof. Also, in embodiments, there is a listener and proxy table structure configured for each type of data.

Figure 4:
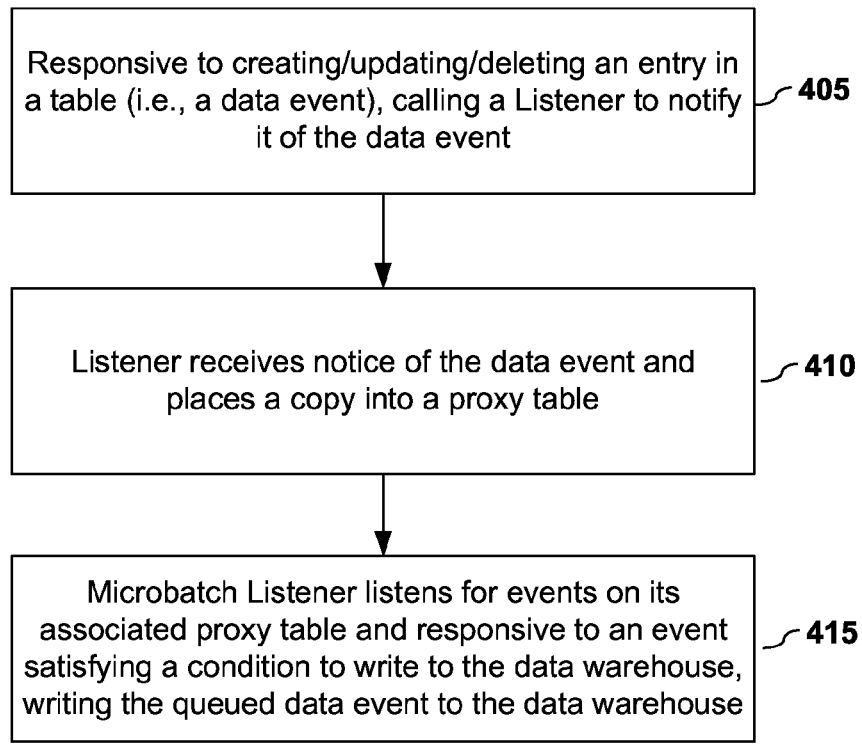
FIG. 4 depicts a method that may be performed by embodiments of the present invention, including that depicted in FIG. 3.

FIG. 4 depicts a method that may be performed by embodiments of the present invention, including that depicted in FIG. 3. When an event causes a deletion, an update to an entry, or a creation of a new table entry in the partitioned table, a synchronous listener is called (405). In embodiments, that listener then places (410) a copy of the data event, which included the data, into a proxy table 335. One skilled in the art shall recognize that there are number of mechanisms and factors by which the listener may select or identify a proxy table into which the data event should be entered. For example, in embodiments, the listener may place the data into a proxy table based upon data type, load balancing factors, performance, priority of data, etc. FIG. 5 depicts an example of a mechanism by which a listener may identify a proxy table/queue to place the data event for fast ingest according to embodiments of the present invention.

Figure 5:
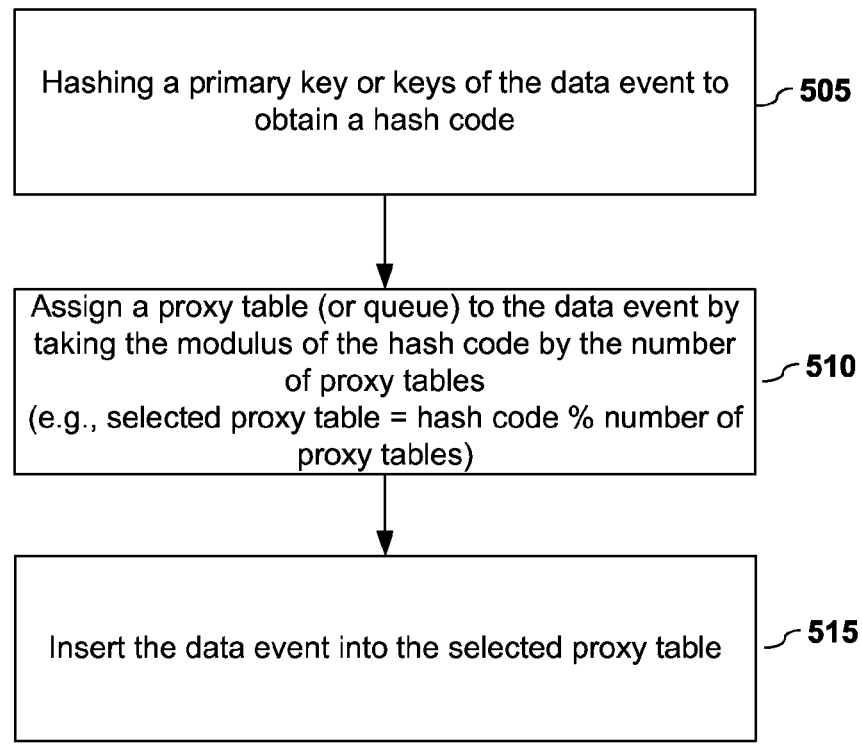
FIG. 5 depicts an example of a mechanism by which a listener may select a proxy table/queue to place data for fast ingest according to embodiments of the present invention.

In the embodiment depicted in FIG. 5, the method by which a listener may select or identify a proxy table/queue to place the data event begins by hashing (505) a key or keys of the data event, such as a primary key, to obtain a hash code. A proxy table (or queue) may then be selected (510) to receive the data event by taking the modulus of the hash code by the number of proxy tables, according to the following formula:

Proxy Table=(Hash code of primary key(s))%(Number of Proxy Tables)

Having identified a proxy table, the data event is inserted (515) into the selected proxy table. In embodiments, if the partitioned table is lacking any primary keys, the listener may use a round robin strategy or some other load balancing mechanism to select the proxy table.

Returning to FIG. 4, each proxy table has a microbatch listener (e.g., item 340 of FIG. 3), which may also be referred to as a write-behind listener, installed on or associated with one of the proxy listeners 335. Each microbatch listener listens (415) for events on its associated proxy table and, responsive to an event satisfying a condition to write to the data warehouse, writes the queued data to the data warehouse. One skilled in the art shall recognize that a number of conditions/parameters may be used to trigger a microbatch write to the data warehouse. For example, the condition or conditions may be that after a certain period of time, after the microbatch queue has recorded a set number of events, or a combination thereof, the microbatch queuing mechanism transmits its data to the data warehouse. In embodiments, once the data has been transmitted, the microbatch is cleared. Alternatively, or additionally, the data entry may have a key or flag that indicates a priority level or quality of service that may cause the data to be sent to the data warehouse in an expedited or a delayed manner, as the case may be.

3. Additional Embodiments

Figure 6:
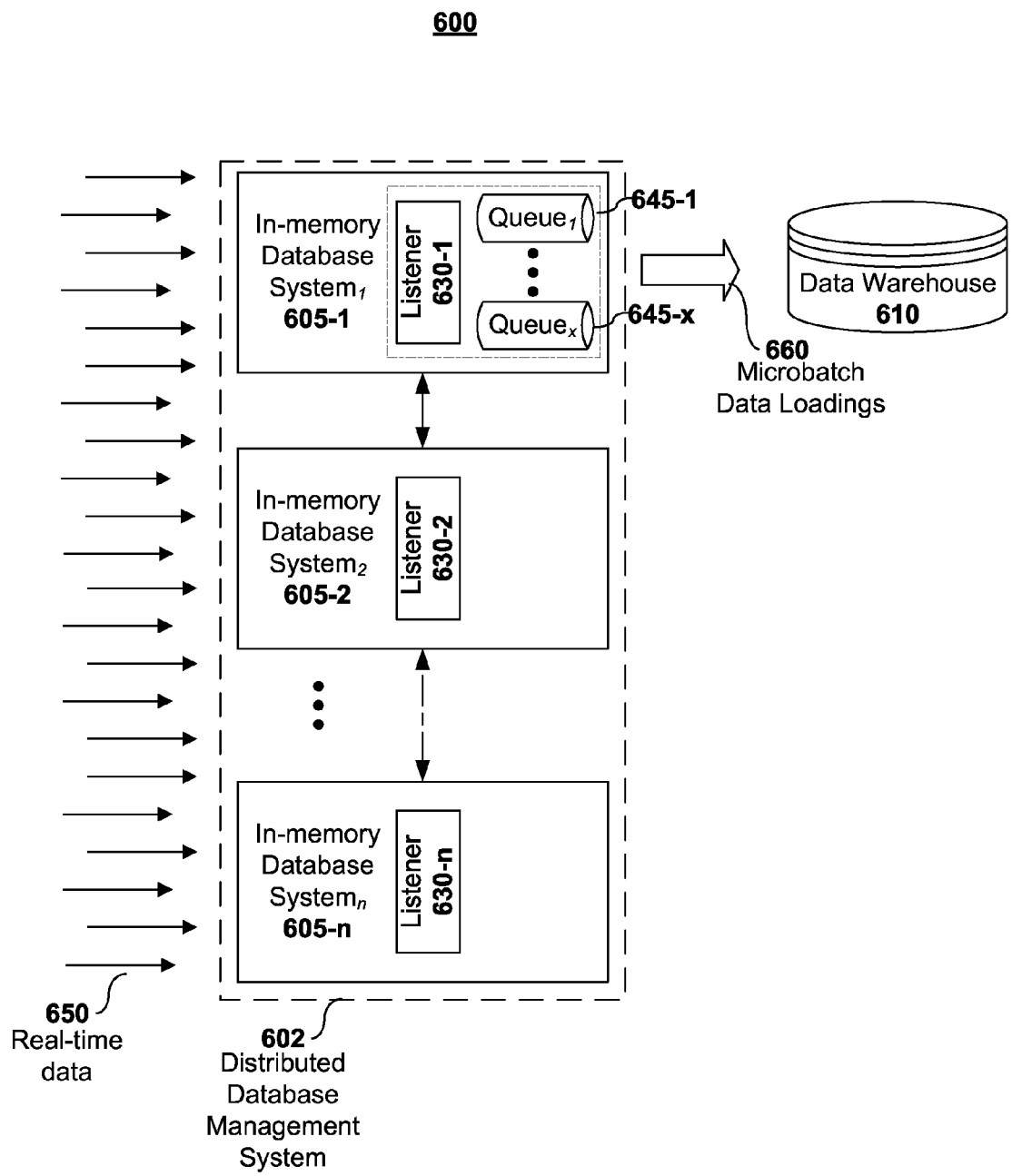
FIG. 6 illustrates a distributed system implementation according to embodiments of the present invention.

FIG. 6 illustrates a distributed system implementation according to embodiments of the present invention. As depicted in FIG. 6, a distributed database management system 602 comprises a plurality of in-memory database system instances (e.g., 605-1 through 605-n) that are communicatively coupled to a data warehouse 610, which may comprise one or more data warehouse systems. In this depicted embodiment, although each in-memory database system 605 includes a listener 630, only one instance of the in-memory database (i.e., in-memory database 605-1 in this example) includes queuing 645.

Although a number of incoming data interactions 650 are received by the distributed system 602 such that any of the in-memory database systems 605 might receive a data interaction, the queuing is performed by only one instance, namely in-memory database system 605-1. In this embodiment, each listener system 630 that receives a data entry in its associated in-memory database may perform the process of identifying which queue (i.e., one of the queues 645-1 through 645-x) receives the data entry, which is then communicated to the appropriate queue. As is well known to those of ordinary skill in the art, resources in a distributed architecture typically register with a locator service, which is a registry where resources can advertise their location so clients and other resources can discover the active resources. Thus, a listener in one in-memory database can readily locate and interact with queuing resources in another in-memory database.

Figure 7:
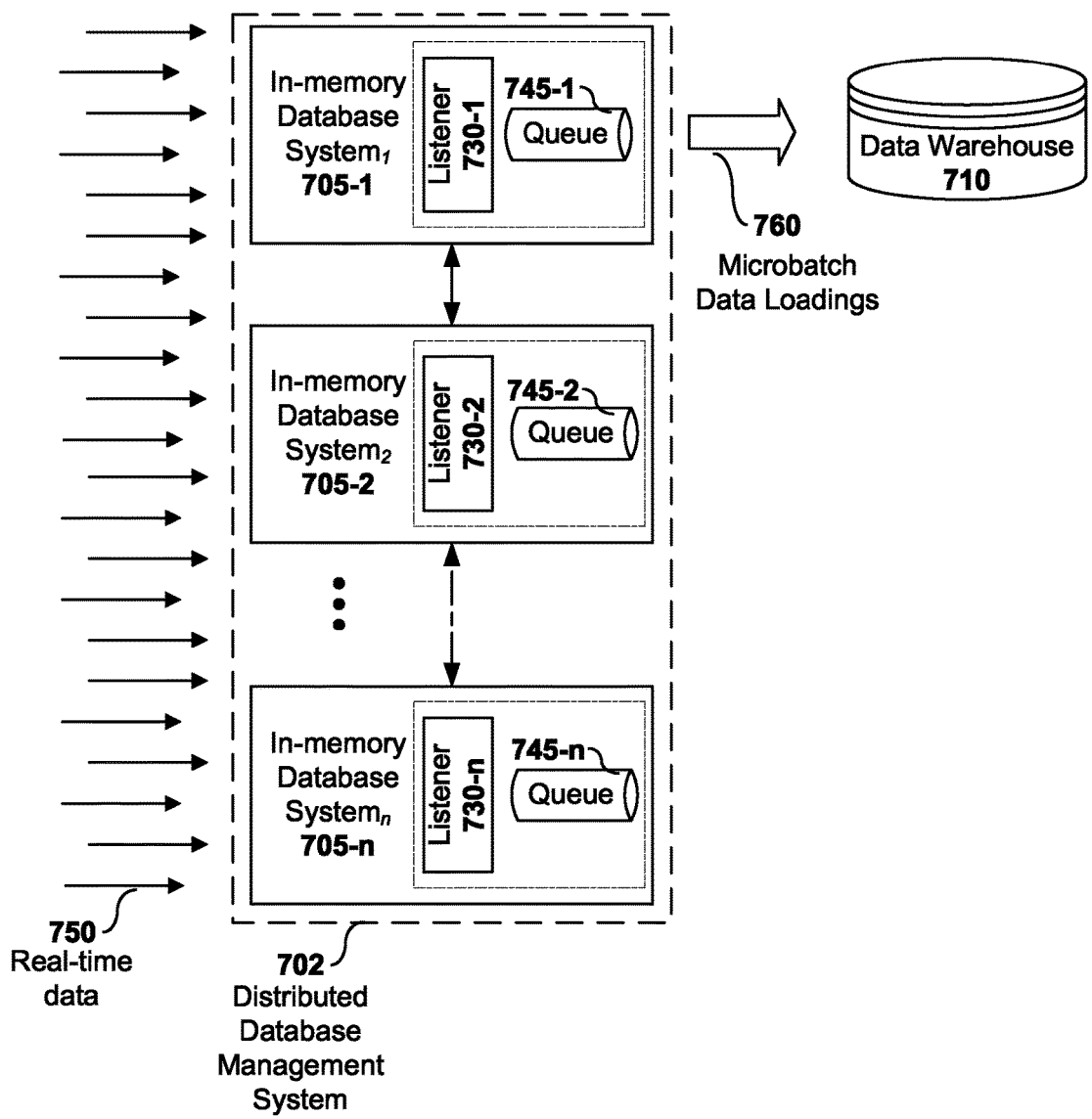
FIG. 7 illustrates an alternative distributed system implementation according to embodiments of the present invention.

FIG. 7 illustrates an alternative distributed system implementation according to embodiments of the present invention. As depicted in FIG. 7, a distributed database management system 702 comprises a plurality of in-memory database system instances (e.g., 705-1 through 705-n) that are communicatively coupled to a data warehouse 710, which may comprise one or more data warehouse systems. In this depicted embodiment, each in-memory database system 705 includes a listener 730 and also includes a queue 745, which comprise a proxy table and an associated microbatch listener. Unlike the embodiment in FIG. 6 in which all the queues resided within a single in-memory database system, the embodiment depicted in FIG. 7 has the queues distributed among the in-memory database systems. One advantage of this configuration is that the queuing is distributed among the various system 702 resources, which can improve throughput. In embodiments, no network hop is necessary in this architecture since the queue used for each event is defined in the in-memory database system where the event occurred.

As with the embodiment in FIG. 6, each listener 745 in the embodiments in FIG. 7 that receives a data entry in its associated in-memory database may perform the process of identifying which queue (i.e., one of the queues 745-1 through 745-$n$) receives the data entry, which is then communicated to the appropriate queue. Once again, in embodiments, using a locator or registry, a listener in one in-memory database may readily locate and interact with queuing resources in the other in-memory databases.

Figure 8A:
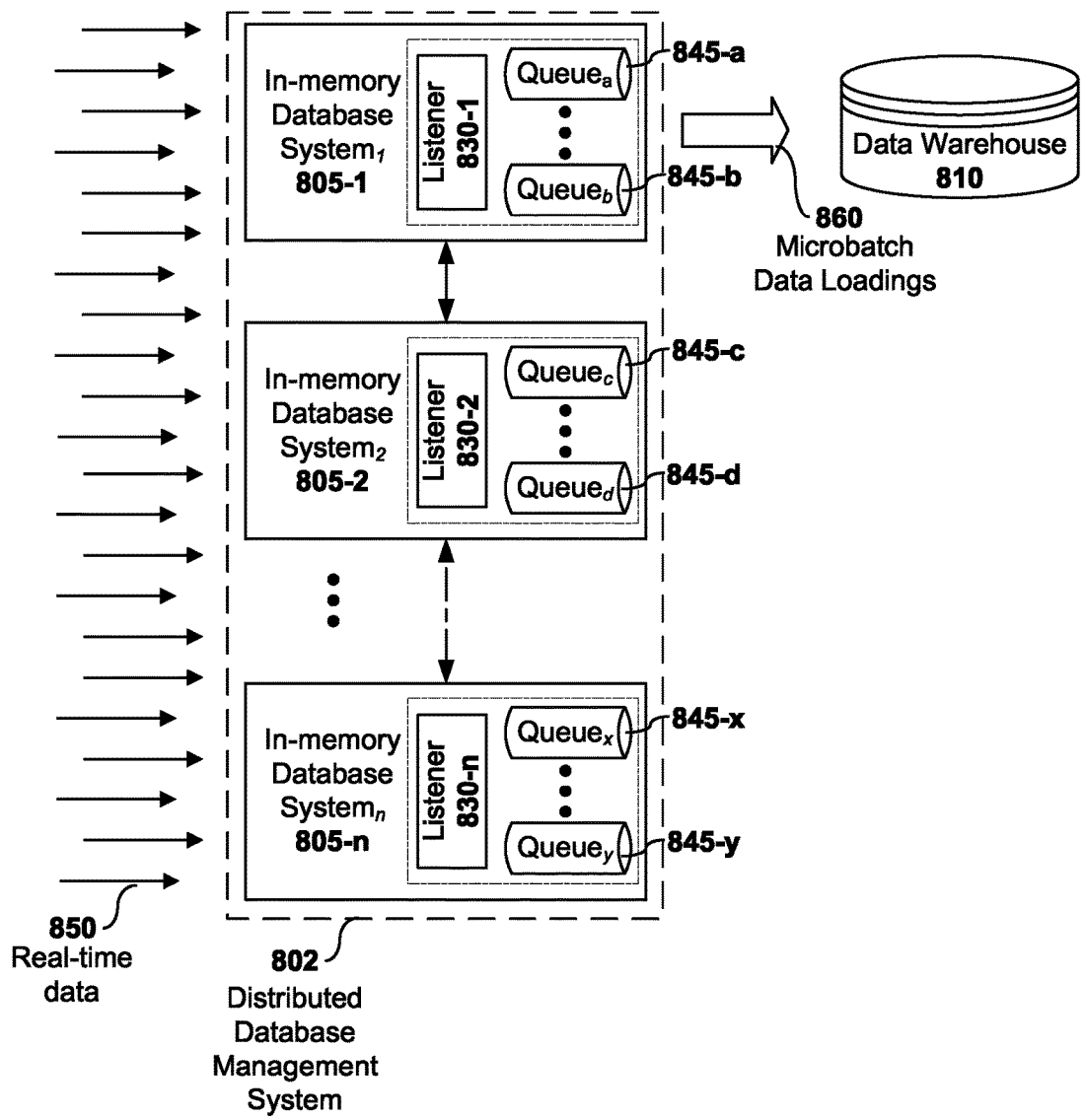
FIG. 8(a) illustrates yet another alternative distributed system implementation according to embodiments of the present invention.
Figure 8B:
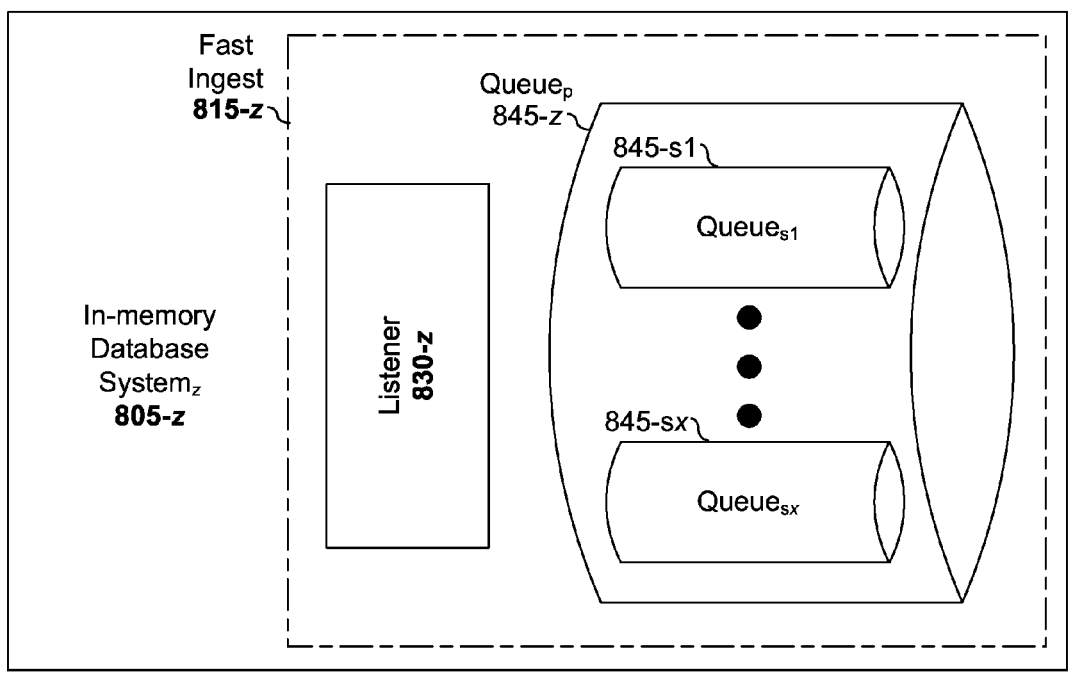
FIG. 8(b) graphically illustrates nested queuing within a fast ingest module according to embodiments of the present invention.

FIG. 8($a$) illustrates yet another alternative distributed system implementation according to embodiments of the present invention. As depicted in FIG. 8($a$), a distributed database management system 802 comprises a plurality of in-memory database system instances (e.g., 805-1 through 805-$n$) that are communicatively coupled to a data warehouse 810, which may comprise one or more data warehouse systems. In this depicted embodiment, each in-memory database system 805 includes a listener 830 and also includes one or more queues 845, in which each queue may comprise a proxy table and an associated microbatch listener. One advantage of this configuration is that the queuing is distributed among the various system 802 resources, which can improve throughput. In embodiments, not only does this architecture reduce network hops like some embodiments of FIG. 7, it also partitions the microbatch data loading among multiple threads within a single in-memory database instance. One skilled in the art shall recognize that embodiments of the architectures in FIGS. 6, 7, and 8, are more and more parallelized and provide better and better throughput.

As with the embodiments in FIGS. 6 and 7, each listener 845 in the embodiments in FIG. 8($a$) that receives a data event in its associated in-memory database may perform the process of identifying which queue (i.e., one of the queues 845-1 through 845-$y$) receives the data event, which is then communicated to the appropriate queue. Once again, in embodiments, using a locator or registry, a listener in one in-memory database may readily locate and interact with queuing resources in the other in-memory databases.

As with the embodiments of FIG. 7, one benefit of the embodiments of FIG. 8($a$) is the potential for improve throughput performance. One skilled in the art shall recognize that the system 800 of FIG. 8 may be configured into different embodiments to achieve various benefits. For example, in embodiments, one set of queues in one instance may be a redundant set of queues as a back-up in case there is a problem with the primary set of queues. The redundancy may be within the same in-memory database system, may be across in-memory database systems, or both.

In another embodiment, a set of queues within an in-memory database may be used to further differentiate a data entry to provide even more graduated levels of updates to the data warehouse. To better illustration this embodiment, consider the illustration in FIG. 8($b$). FIG. 8($b$) illustrates an in-memory database system in which queuing may be nested according to embodiments of the present invention. As shown in FIG. 8($b$), the queuing within the fast ingest module 815-$z$ may be thought of as nested queuing. For example, in embodiments, all data events associated with one primary key may be sent to the primary queue 845-$z$ and the data events may then be further separated. In one embodiment, the events may be differentiated using a secondary key to place data events into one of the sub-queues (e.g., queue$_{s1}$-queue$_{sx}$). Alternatively, or additionally, in embodiments, the events may be sent to the primary queue and then distributed to one of the sub-queues using a load balancing mechanism, such as by way of illustration and not limitation, round robin scheme.

One skilled in the art shall recognize that the configurations of FIG. 8($b$) may be repeated at further levels, such that there are several nested levels of queuing. One skilled in the art shall recognize other possible configurations, which shall be considered part of the current patent disclosure.

Figure 9:
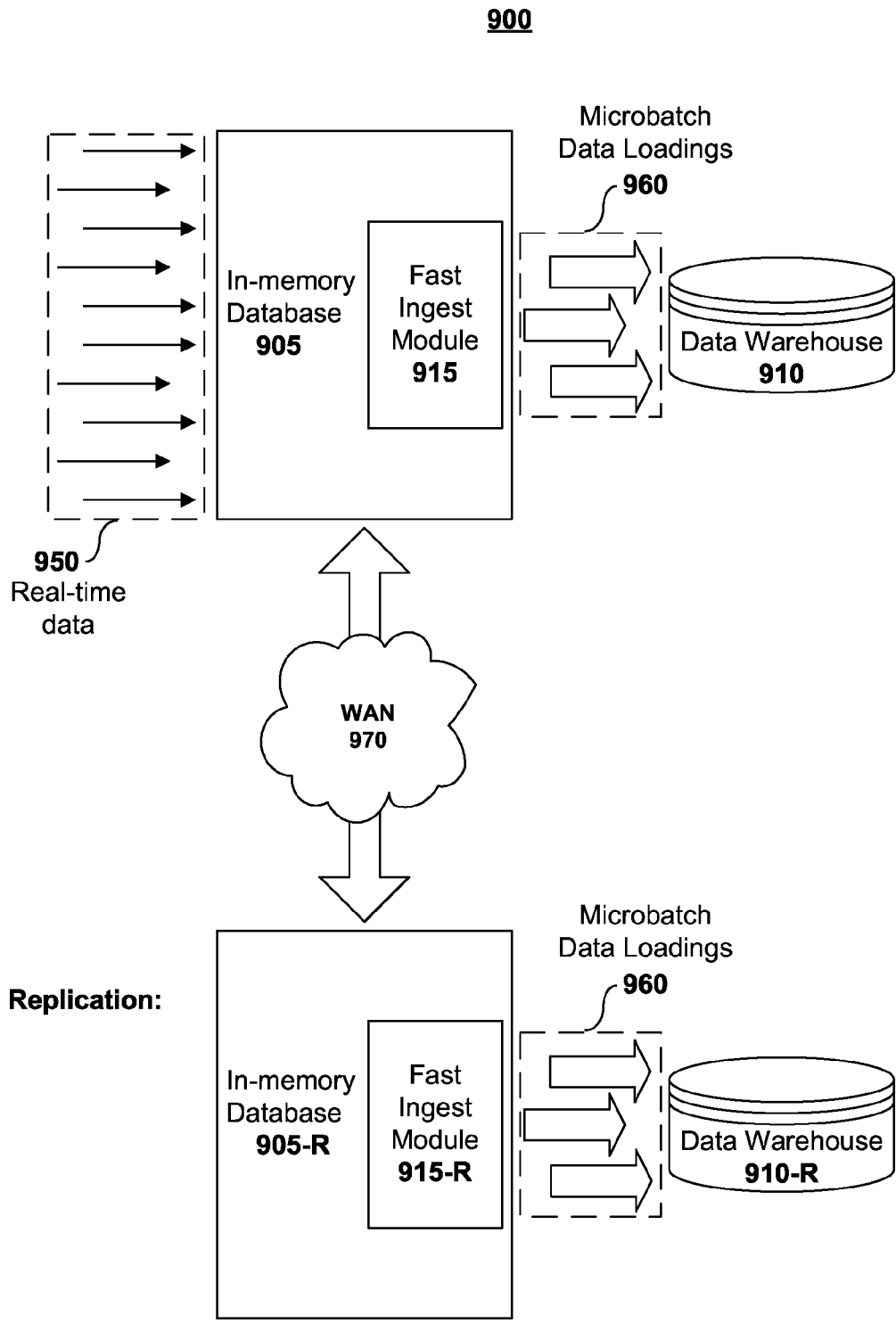
FIG. 9 illustrates fast data replication according to embodiments of the present invention.

Turning now to FIG. 9, depicted is an embodiment that allows for replication of data at the "fast data" level rather than at the "big data" level according to embodiments of the present invention. In-memory databases tend to be implemented in RAM, while data warehouses tend to be implemented using disk storage. Because RAM devices generally perform read and write operations faster than disk-based systems, in embodiments, data replication may be performed, not at the data warehouse level, but rather at the in-memory database level. By moving the replication process to the in-memory database, it can be performed more quickly. Thus, FIG. 9 depicts a system in which the data is replicated is performed at the in-memory database level.

As show in FIG. 9, an in-memory database 905 may be connected via a network connection, such as a wide area network (WAN) connection 970 to another in-memory database 905-R that is used to replicate the data. As mentioned before, the data from the in-memory database 905 was typically sent in one large batch to the data warehouse 910. Sometimes the time required to perform the batch can be substantial, which means that the data warehouse does not have sufficient time to then replicate this data for back-up purposes. Thus, rather than performing the replication at the data warehouse, it is performed at the in-memory database level. In embodiments, one or more of the microbatch queuing embodiments may be employed in the primary in-memory database 905 to send the data to the replicated in-memory database in like manner as previously described, as if it 905-R were a data warehouse.

In embodiments, one or more of the microbatch queuing embodiments may be employed in the primary in-memory database 905, the replicate database 905-R, or both. However, in embodiments, the primary in-memory database 905 may employ a fast ingest module (e.g., 915), while the replicate database 905-R may simply use a traditional batch process to send the replicated data to the data warehouse back-up 910-R.

Figure 10:
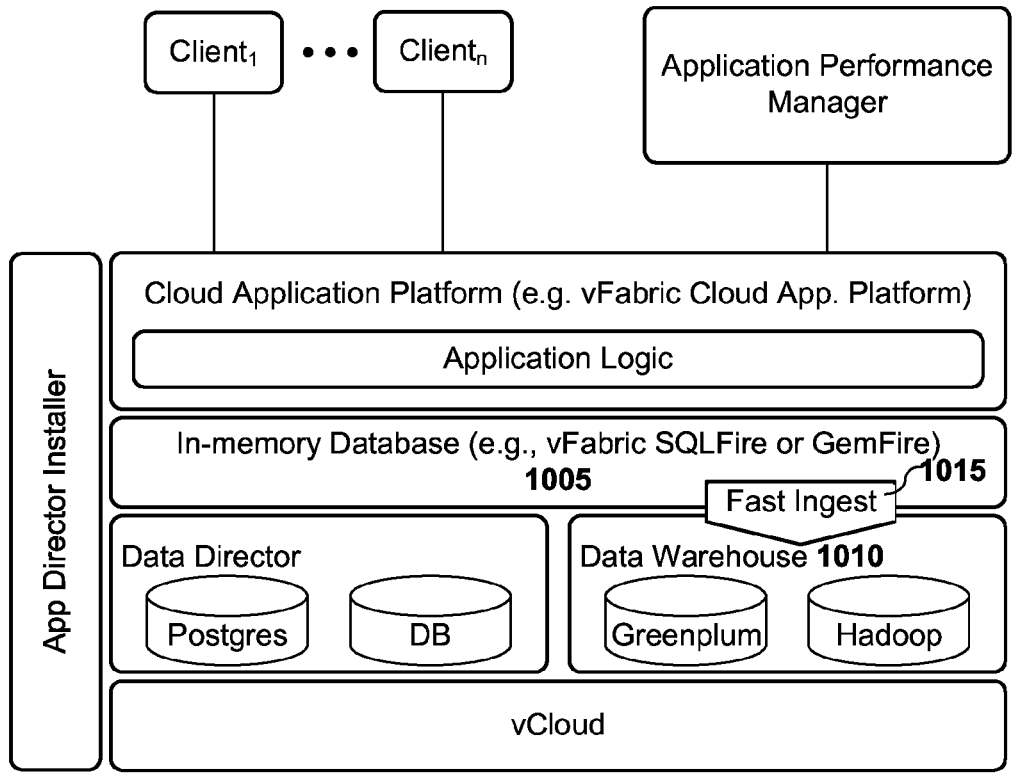
FIG. 10 illustrates a cloud-based implementation that includes fast data ingest according to embodiments of the present invention.
Figure 11:
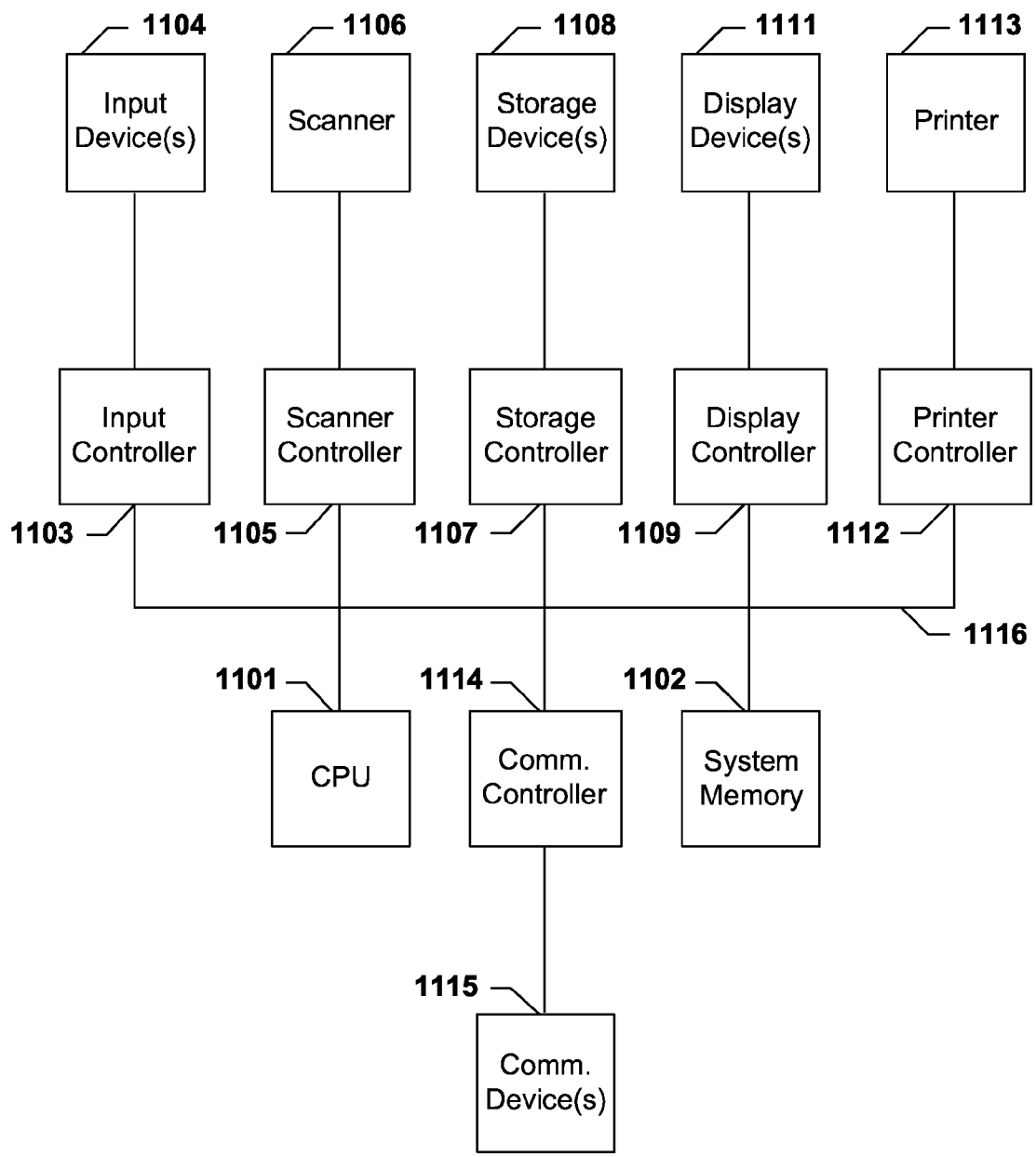
FIG. 11 depicts a block diagram illustrating an exemplary system which may be used to implement aspects of the present invention.

Turning now to FIG. 10, depicted is a cloud-based implementation according to embodiments of the present invention. One skilled in the art shall recognize that embodiments of the fast ingest may be implemented in a cloud environment. FIG. 10 graphically illustrates an example of a cloud-based architecture according to embodiments of the present invention. Note that the fast ingest 1015 facilitates keeping data in the data warehouse 1010 better in sync with the in-memory database 1005.

4. Additional Applications

One skilled in the art shall recognize useful applications of systems that include the fast data ingest. Because the data warehouse can now be updated in real time (or nearly real time), a system that includes fast ingest has the benefits of the "Fast Data" of the in-memory system plus the deep analytics of the data warehouse system (i.e., the "Big Data" system).

Furthermore, in embodiments, such systems may support prioritized data analytics. In such embodiments, one or more markers and one or more listeners may be added to facilitate prioritization of data updates to a data warehouse, prioritization of queries, or both. In embodiments, there may be one or more secondary listeners that look at the one or more markers to facilitate their processing.

For example, in embodiments, the data tables may include an entry for a marker, such as a time stamp, that helps keep track of the status of the data updates between the in-memory and data warehouse systems. Thus, for example, if a query is performed that requires both the real-time data or near real-time data and historical data, the query may be time stamped or include a time stamp requirement and the data warehouse will not perform the query until it has received correct updates based upon the time stamps of the data. Alternatively or additionally, the data, analytics, or both may be returned by the data warehouse to the in-memory database and the in-memory database may supplement the data, the analytics, or both with data that has transpired in the interim thereby achieving real-time plus big data analytics. As previously noted, such systems may also include one or more markers that indicate whether and/or when a query, data, or both should be prioritized. In embodiments, the prioritization, markers, or other indicators may be specified as part of a SQL query that may be made to the in-memory database, the data warehouse, or both.

5. Computing System Embodiments

Having described the details of the invention, an exemplary system 1000, which may be used to implement one or more aspects of the present invention, will now be described with reference to FIG. 10. As illustrated in FIG. 10, the system includes a central processing unit (CPU) 1001 that provides computing resources and controls the computer. The CPU 1001 may be implemented with a microprocessor or the like, and may also include a graphics processor and/or a floating point coprocessor for mathematical computations. The system 1000 may also include system memory 1002, which may be in the form of random-access memory (RAM) and read-only memory (ROM).

A number of controllers and peripheral devices may also be provided, as shown in FIG. 10. An input controller 1003 represents an interface to various input device(s) 1004, such as a keyboard, mouse, or stylus. There may also be a scanner controller 1005, which communicates with a scanner 1006. The system 1000 may also include a storage controller 1007 for interfacing with one or more storage devices 1008 each of which includes a storage medium such as magnetic tape or disk, or an optical medium that might be used to record programs of instructions for operating systems, utilities and applications which may include embodiments of programs that implement various aspects of the present invention. Storage device(s) 1008 may also be used to store processed data or data to be processed in accordance with the invention. The system 1000 may also include a display controller 1009 for providing an interface to a display device 1011, which may be a cathode ray tube (CRT), a thin film transistor (TFT) display, or other type of display. The system 1000 may also include a printer controller 1012 for communicating with a printer 1013. A communications controller 1014 may interface with one or more communication devices 1015, which enables the system 1000 to connect to remote devices through any of a variety of networks including the Internet, a local area network (LAN), a wide area network (WAN), or through any suitable electromagnetic carrier signals including infrared signals.

In the illustrated system, all major system components may connect to a bus 1016, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including magnetic tape or disk or optical disc, or a transmitter, receiver pair.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

While the inventions have been described in conjunction with several specific embodiments, it is evident to those skilled in the art that many further alternatives, modifications, and variations will be apparent in light of the foregoing description. Thus, the inventions described herein are intended to embrace all such alternatives, modifications, applications, and variations as may fall within the spirit and scope of the disclosure and the disclosure combined with understanding of those skilled in the art.

What is claimed is:

1. A computer-implemented method comprising:
    receiving, by a distributed in-memory database system in real-time or near real-time, a plurality of data events, wherein the in-memory database system comprises a plurality of in-memory database instances operating in parallel, and wherein a listener and a plurality of queues are installed on a single first in-memory database instance of the plurality of in-memory database instances, and wherein the listener receives, from one or more other in-memory database instances of the distributed in-memory database system, notifications of data events received by the one or more other in-memory database instances of the distributed in-memory database system;
    receiving, by the listener, a notification that a data event has been received by one of the in-memory database instances of the distributed in-memory database system;

selecting a queue of the plurality of queues in which the data event should be stored, each queue of the plurality of queues comprising a respective microbatch listener;
storing the data event in the selected queue;
determining, by the microbatch listener of the selected queue, that an update condition has been satisfied for updating a data warehouse system with data events stored in the selected queue;
in response, storing the data event in the data warehouse system;
receiving, by the in-memory database system, a query;
obtaining first query results that satisfy the query from historical data in the data warehouse system, the historical data including the received data event stored in the data warehouse system;
obtaining second query results from the in-memory database instance that each identify in-memory data events that are not stored in the data warehouse system; and
providing the first query results and the second query results in a response to the query.

2. The method of claim 1, wherein one or more of the second query results identify data events not stored in the data warehouse system that were received by the in-memory database instance after the query was received.

3. The method of claim 1, wherein the update condition specifies a period of time, a number of received data events, or both.

4. A system comprising:
one or more computers and one or more storage devices storing instructions that are operable, when executed by the one or more computers, to cause the one or more computers to perform operations comprising:
receiving, by a distributed in-memory database system in real-time or near real-time, a plurality of data events, wherein the in-memory database system comprises a plurality of in-memory database instances operating in parallel, and wherein a listener and a plurality of queues are installed on a single first in-memory database instance of the plurality of in-memory database instances, and wherein the listener receives, from one or more other in-memory database instances of the distributed in-memory database system, notifications of data events received by the one or more other in-memory database instances of the distributed in-memory database system;
receiving, by the listener, a notification that a data event has been received by one of the in-memory database instances of the distributed in-memory database system;
selecting a queue of the plurality of queues in which the data event should be stored, each queue of the plurality of queues comprising a respective microbatch listener;
storing the data event in the selected queue;
determining, by the microbatch listener of the selected queue, that an update condition has been satisfied for updating a data warehouse system with data events stored in the selected queue;
in response, storing the data event in the data warehouse system;
receiving, by the in-memory database system, a query;
obtaining first query results that satisfy the query from historical data in the data warehouse system, the historical data including the received data event stored in the data warehouse system;
obtaining second query results from the in-memory database instance that each identify in-memory data events that are not stored in the data warehouse system; and
providing the first query results and the second query results in a response to the query.

5. The system of claim 4, wherein one or more of the second query results identify data events not stored in the data warehouse system that were received by the in-memory database instance after the query was received.

6. The system of claim 4, wherein the update condition specifies a period of time, a number of received data events, or both.

7. A computer program product comprising one or more non-transitory computer storage media storing instructions that when executed by one or more computers cause the one or more computers to perform operations comprising:
receiving, by a distributed in-memory database system in real-time or near real-time, a plurality of data events, wherein the in-memory database system comprises a plurality of in-memory database instances operating in parallel, and wherein a listener and a plurality of queues are installed on a single first in-memory database instance of the plurality of in-memory database instances, and wherein the listener receives, from one or more other in-memory database instances of the distributed in-memory database system, notifications of data events received by the one or more other in-memory database instances of the distributed in-memory database system;
receiving, by the listener, a notification that a data event has been received by one of the in-memory database instances of the distributed in-memory database system;
selecting a queue of the plurality of queues in which the data event should be stored, each queue of the plurality of queues comprising a respective microbatch listener;
storing the data event in the selected queue;
determining, by the microbatch listener of the selected queue, that an update condition has been satisfied for updating a data warehouse system with data events stored in the selected queue;
in response, storing the data event in the data warehouse system;
receiving, by the in-memory database system, a query;
obtaining first query results that satisfy the query from historical data in the data warehouse system, the historical data including the received data event stored in the data warehouse system;
obtaining second query results from the in-memory database instance that each identify in-memory data events that are not stored in the data warehouse system; and
providing the first query results and the second query results in a response to the query.

8. The computer program product of claim 7, wherein one or more of the second query results identify data events not stored in the data warehouse system that were received by the in-memory database instance after the query was received.

9. The computer program product of claim 7, wherein the update condition specifies a period of time, a number of received data events, or both.

* * * * *